Patented June 13, 1950

2,511,803

UNITED STATES PATENT OFFICE 2,511,803

ANTIOXIDANT FLAKES

Lloyd A. Hall, Chicago, Ill., assignor to The Griffith Laboratories, Inc., a corporation of Illinois No Drawing. Application May 18, 1948,
Serial No. 27,836

8 Claims. (Cl. 99—163)

This invention relates to a non-toxic antioxidant in the form of flakes for use in food materials, especially fatty substances, and relates particularly to such an antioxidant having as one constituent an antioxidant acid, particularly of the class consisting of benzoic, fumaric, tartaric, phosphoric, ascorbic and citric acids in combination with a gallic ester and a hydrogenated edible oil.

The antioxidant of this invention is used for stabilizing such food substances as lard, oleo oil, butter, peanut butter, mayonnaise, cheese spreads, vegetable oil, fish oils, hydrogenated fats, milk powder, egg powder, sausage, bacon, oil soluble vitamins, chocolate, cocoa, cocoa butter, coconut fats, essential oils, margarine, lanolin and other fatty food products or food products containing large amounts of fatty matter which are subject to rancidity development.

Oils and fats often become rancid, which in the case of otherwise edible products, renders them unfit for human consumption. Some of the constituents of oils and fats are known to possess the tendency to absorb or react with oxygen. Thus, rancidity development results primarily from the products formed during oxidation. The dissolved or absorbed oxygen usually reacts first to form peroxides and the development of peroxides may be further accelerated by moisture, heat, light or catalyst. Aldehydes, ketones, and acids of lower molecular weight may be formed in the further decomposition and these materials also impart an undesirable odor or taste to the oil, fat or food product. The evaluation of rancidity is carried out by what is referred to as the Active Oxygen Method (A. O. M.). It pertains to the amount of peroxides developed per kilogram of fat under standard conditions of acceleration. This test is also sometimes called the Swift Stability Test. Figures greater than those for the control indicate antioxidant value.

A great deal of work has been done on antioxidants for use in food products and particularly in animal fats such as lard. Some of the suggested materials have been highly successful, but extremely expensive. Some of the most effective materials have had to be incorporated in a volatile solvent, the removal of which is expensive and cannot be accomplished at most small rendering plants. Some of the suggested products have been toxic and unfit for use in food. The use of vegetable oils in antioxidant preparations has been suggested, but it has been necessary to use these oils in such quantity as to seriously lower the melting point of the lard mixtures. The compositions herein described may be employed to extend the keeping time and preserve fats and oils and other food materials.

Many of the prior antioxidants, when used with fatty substances, become discolored in the presence of various metals and this causes discoloration of the food. The organic acid of the present invention serves to prevent this discoloring as it combines with various metals such as iron, copper and nickel and thereby prevents discoloration in white fats such as lard.

The gallic esters that may be used include methyl gallate, ethyl gallate, propyl gallate, butyl gallate, hexyl gallate, lauryl gallate and mixtures thereof. The antioxidant acid that is used may be either benzoic, fumaric, tartaric, phosphoric, ascorbic or citric acid, or mixtures thereof.

The edible oil that is used is a hydrogenated oil that is solid at ordinary room temperatures. These hydrogenated oils include cottonseed oil, soya oil and the like and mixtures thereof.

The antioxidant composition of this invention is preferably prepared by making a concentrate containing the acid and the gallic ester, at least partially dissolved in the hydrogenated oil, and then mixing this concentrate with the desired amount of hydrogenated oil to make the antioxidant material with the ingredients therein in the concentrations desired. This antioxidant material is then flaked as on ordinary commercial flake rollers and the flakes are added to the fatty food to be stabilized. If desired, however, the gallic ester and acid may be added directly to the desired amounts of hydrogenated oils. All ingredients should be anhydrous.

When the flake concentrate is prepared first, it is preferred that the proportions of the ingredients be within the following ranges:

Table I

| | Per cent |
|---|---|
| Gallic ester | 1.5 to 7.5 |
| Antioxidant acid | 1.5 to 7.0 |
| Hydrogenated fat | 97.0 to 84.5 |

Excellent results have been achieved by employing 2.0% propyl gallate, 3.0% citric acid and 95.0% hydrogenated fat.

In making the antioxidant flakes, the above flake concentrate is mixed in an amount preferably between 1 and 10%, inclusive, into a body of melted hydrogenated fat. The gallic ester and the antioxidant acid will dissolve completely in the fat. The solution is then flaked on an ordinary commercial flaking roll to produce the antioxidant flakes. These flakes may be added in any amount desired to a fatty food in order to stabilize the food. These flakes preferably, but not necessarily, have the various ingredients in the following proportions:

Table II

| | Per cent |
|---|---|
| Gallic ester | 0.015 to 0.75 |
| Antioxidant acid | 0.015 to 0.70 |
| Hydrogenated fat | 99.970 to 98.55 |

Ordinarily from about 1 to 6%, inclusive, of the flakes are added to the fatty food.

All percentages given herein are by weight.

In one method of making antioxidant flakes, 475 pounds of hydrogenated fat are heated to 205–212° F. 10 pounds of propyl gallate are then added and the mixture is agitated until the propyl gallate has become completely dissolved. This ordinarily takes about one hour. 15 pounds of citric acid are then sifted through a 20-mesh sieve onto the surface of the oil and agitation is continued for about one-half hour. The resulting concentrate is cooled and mixed thoroughly as it will be found that not all of the citric acid has gone into solution. In order to prepare the final antioxidant flakes, the 500 pounds of concentrate is mixed with 9500 pounds of melted hydrogenated fat and the mixture agitated to insure complete solution of the citric acid and propyl gallate. The oil solution is then flaked on ordinary flaking rollers to produce the final product. These flakes have the various ingredients in the following proportions:

*Table III*

| | Percent |
|---|---|
| Propyl gallate | 0.10 |
| Citric acid | 0.15 |
| Hydrogenated fat | 99.75 |

In using the antioxidant flakes, any amount of the flakes desired may be added to the fat to be stabilized. Ordinarily between 1 and 6% of the flakes are added to the fat, such as a fatty food. It has been found that the antioxidant flakes will increase the A. O. M. hours many times over the A. O. M. hours of the untreated fat.

I have discovered that some antioxidants will be extracted by water when fats such as lard with these antioxidants incorporated therein are used in preparing baked goods. For best results, those antioxidants that are not extracted by water should be employed as it has been proven that they are more effective in retarding rancidity in baked products. The superiority of these non-extracted antioxidants can be proven by following the methods set out by Matil and Black in the Journal of the Oil Chemists Society, vol. 24, page 325 (1947). In this method, the antioxidants to be tested are added to a fat, such as lard, and then extracted with hot water. These extracted lards were then analyzed for their antioxidant content and the A. O. M. values were determined. It was discovered by this method that lecithin is not only useful as an antioxidant, but also serves to reduce the amounts of the other antioxidants that are normally extracted with hot water. It is believed that the lecithin serves to emulsify the water in the lard and thus reduces the amounts of antioxidant extracted. It was discovered that hexyl and lauryl gallates are more fat soluble than either methyl, ethyl, propyl or butyl gallates. In one test employing propyl gallate in an antioxidant composition, it was found that the hot water extraction produced 71% decrease in A. O. M. hours dropping from 29 to 8.5 hours. In another test, where the same amount of hexyl gallate was used, the water extraction caused only a 41.5% decrease in A. O. M. value, from 29 to 17 hours. In a third test, where an equal amount of lauryl gallate was used, the water extraction resulted in only a 26% decrease in A. O. M. value, from 21 to 15.5 hours. Thus, hexyl and lauryl gallates are in general the preferred gallic esters as they are more fat soluble than the others set out herein. Lauryl gallate, however, is not as effective an antioxidant as hexyl gallate as its initial A. O. M. hours are less. These tests prove, therefore, that hexyl gallate is the preferred gallic ester as it is more fat soluble than most of the others named herein and has a high antioxidant value. However, data set out herein proves that methyl, ethyl, propyl and butyl gallates are also useful in making excellent antioxidant compositions.

In one embodiment of the invention a flake concentrate was made by heating hydrogenated fat at about 212° F. 2% of propyl gallate was added and the mixture agitated until the propyl gallate was dissolved. This took about 50 minutes. 3% of citric acid was added in finely powdered form and the mixture agitated until uniform. 5% of the flake concentrate was added to 95% hydrogenated fat and the antioxidant product flaked on flaking rolls. When 3 pounds of the flakes were mixed with 97 pounds of lard, the A. O. M. value of the stabilized lard was 60 hours.

The A. O. M. value of the untreated lard was only 4 hours.

The foregoing detailed description is given for clearness of understanding only, and no unnecessary limitations should be understood therefrom, for some modifications will be obvious to those skilled in the art.

I claim:

1. An antioxidant composition comprising from 99.97 to 98.55% by weight of a solid hydrogenated fat in the form of flakes having dissolved therein from 0.015 to 0.70% of an antioxidant acid of the class consisting of benzoic, fumaric, tartaric, phosphoric, ascorbic and citric acids and from 0.015 to 0.75% of a gallic ester of the class consisting of methyl, ethyl, propyl, butyl, hexyl and lauryl gallates.

2. The composition of claim 1 wherein the ester comprises propyl gallate.

3. The composition of claim 1 wherein the ester comprises lauryl gallate.

4. The composition of claim 1 wherein the ester comprises hexyl gallate.

5. The composition of claim 1 wherein the acid comprises citric acid.

6. The composition of claim 1 wherein the acid comprises ascorbic acid.

7. The composition of claim 1 wherein the acid comprises phosphoric acid.

8. An antioxidant composition comprising 99.75% by weight of a solid hydrogenated fat in the form of flakes having dissolved therein 0.15% of citric acid and 0.10% of propyl gallate.

LLOYD A. HALL.

REFERENCES CITED

The following references are of record in the file of this patent:

UNITED STATES PATENTS

| Number | Name | Date |
|---|---|---|
| 2,373,192 | Lauer | Apr. 10, 1945 |
| 2,408,904 | Black | Oct. 8, 1946 |
| 2,444,307 | Penn | June 29, 1948 |

OTHER REFERENCES

Bergel. Chem. and Ind., Apr. 1, 1944, pages 127–8.